(12) United States Patent
Sloop

(10) Patent No.: US 7,644,535 B2
(45) Date of Patent: Jan. 12, 2010

(54) AERATED BUCKET FOR LIVE BAIT

(76) Inventor: Stephen S. Sloop, 508 E. 5$^{th}$ St., Woodbine, GA (US) 31569

( * ) Notice: Subject to any disclaimer, the term of this patent is extended or adjusted under 35 U.S.C. 154(b) by 236 days.

(21) Appl. No.: 11/900,507

(22) Filed: Sep. 12, 2007

(65) Prior Publication Data

US 2009/0064565 A1    Mar. 12, 2009

(51) Int. Cl.
*A01K 97/05* (2006.01)
(52) U.S. Cl. .............................. 43/56; 43/57
(58) Field of Classification Search .......... 43/55–57
See application file for complete search history.

(56) References Cited

U.S. PATENT DOCUMENTS

| 194,253 | A | * | 8/1877 | Lasater | 43/56 |
| 204,168 | A | * | 5/1878 | Roney | 43/56 |
| 247,690 | A | * | 9/1881 | Rodman | 43/56 |
| 299,690 | A | * | 6/1884 | Sherwood | 43/56 |
| 302,086 | A | * | 7/1884 | Barton | 43/56 |
| 372,124 | A | * | 10/1887 | Craig | 43/56 |
| 435,211 | A | * | 8/1890 | Darrah | 43/56 |
| 513,740 | A | * | 1/1894 | Thoma et al. | 43/56 |
| 514,476 | A | * | 2/1894 | Kersey | 43/57 |
| 531,112 | A | * | 12/1894 | Gilmore | 43/56 |
| 553,456 | A | * | 1/1896 | Ferris | 43/56 |
| 647,257 | A | * | 4/1900 | Gray | 43/57 |
| 668,507 | A | * | 2/1901 | Fisk | 43/57 |
| 713,890 | A | * | 11/1902 | Koch | 43/56 |
| 769,874 | A | * | 9/1904 | Paar | 43/56 |
| 859,617 | A | * | 7/1907 | Rimmelin | 43/56 |
| 953,540 | A | * | 3/1910 | Montgomery | 43/56 |
| 965,662 | A | * | 7/1910 | Sonke | 43/56 |
| 986,229 | A | * | 3/1911 | Seeger | 43/56 |
| 1,110,892 | A | * | 9/1914 | Cather | 43/56 |

(Continued)

FOREIGN PATENT DOCUMENTS

JP           05056735  A  *  3/1993

(Continued)

*Primary Examiner*—Darren W Ark
(74) *Attorney, Agent, or Firm*—Alfred D. Lobo

(57) ABSTRACT

A container for live bait is provided with a bait retrieval assembly of readily available structural components which are combined in an unexpectedly useful manner to allow all operations to be carried out using one hand only. The container, which is closed with a substantially rigid lid, may be of arbitrary cross-section but is preferably either cylindrical or tapered. The bait retrieval assembly includes an L-shaped frame comprising a pair of vertical members and a pair of horizontal members on which a bowl-shaped colander is supported. The vertical members are reciprocable through openings in the lid. The vertical members are required to be in mirror image relationship with one another, and laterally spaced-apart so that the distance between the longitudinal center lines of the members in the bottom portion of the L is less than the distance between longitudinal center lines of the members in the upper portion of the L. The critical wedge-shaped configuration of the vertical members of the L-shaped frame allows the colander, with the bait in it, to be temporarily locked in position, above or near the surface of the water for easy access with one hand. The container is preferably provided with an internal drain assembly and an aerator.

13 Claims, 6 Drawing Sheets

U.S. PATENT DOCUMENTS

| | | | | |
|---|---|---|---|---|
| 1,127,522 | A * | 2/1915 | Rowe | 43/56 |
| 1,745,012 | A * | 1/1930 | Gilmore | 43/56 |
| 1,942,756 | A * | 1/1934 | Howard | 43/56 |
| 2,002,572 | A * | 5/1935 | Forbes et al. | 43/56 |
| 2,082,754 | A * | 6/1937 | Peterson | 43/56 |
| 2,093,132 | A * | 9/1937 | Logan | 43/56 |
| 2,149,996 | A * | 3/1939 | Gulden | 43/56 |
| 2,216,202 | A * | 10/1940 | Lake | 43/56 |
| 2,294,136 | A * | 8/1942 | Smith | 43/56 |
| 2,318,842 | A * | 5/1943 | Eaton | 43/56 |
| 2,474,745 | A * | 6/1949 | Lewis | 43/56 |
| 2,489,710 | A * | 11/1949 | Janisch et al. | 43/56 |
| 2,531,628 | A * | 11/1950 | Janisch et al. | 43/56 |
| 2,551,431 | A * | 5/1951 | Field | 43/55 |
| 2,560,672 | A * | 7/1951 | Volenec et al. | 43/57 |
| 2,570,684 | A * | 10/1951 | Jackson | 43/57 |
| 2,600,826 | A * | 6/1952 | Allen | 43/56 |
| 2,605,581 | A * | 8/1952 | Kranitz | 43/55 |
| 2,644,269 | A * | 7/1953 | Ormesher | 43/55 |
| 2,663,115 | A * | 12/1953 | McKissack | 43/57 |
| 2,720,049 | A * | 10/1955 | Basky | 43/56 |
| 2,731,760 | A * | 1/1956 | Ebert | 43/57 |
| 2,767,507 | A * | 10/1956 | Chiambretti | 43/55 |
| 2,884,736 | A * | 5/1959 | Harrell | 43/56 |
| 2,936,542 | A * | 5/1960 | Butler et al. | 43/57 |
| 3,000,132 | A * | 9/1961 | Koistinen | 43/56 |
| 3,002,312 | A * | 10/1961 | Barker | 43/56 |
| 3,039,225 | A * | 6/1962 | Semelka | 43/56 |
| 3,209,884 | A * | 10/1965 | Stehling | 43/57 |
| 3,236,001 | A * | 2/1966 | Keiter | 43/55 |
| 3,319,372 | A * | 5/1967 | Wright | 43/56 |
| 3,380,186 | A * | 4/1968 | Donner | 43/56 |
| 3,449,855 | A * | 6/1969 | Hassel | 43/56 |
| 3,468,289 | A * | 9/1969 | Broida | 43/55 |
| 3,513,584 | A * | 5/1970 | Donner | 43/56 |
| 3,550,307 | A * | 12/1970 | Donner | 43/56 |
| 3,726,039 | A * | 4/1973 | Borrelli | 43/56 |
| 3,751,845 | A * | 8/1973 | van Leeuwen | 43/56 |
| 3,831,310 | A * | 8/1974 | Frangullie | 43/56 |
| 3,834,062 | A * | 9/1974 | Nalepka | 43/56 |
| 3,882,628 | A * | 5/1975 | Stouder | 43/55 |
| 3,886,679 | A * | 6/1975 | Marcell | 43/55 |
| 3,955,306 | A * | 5/1976 | Handa | 43/56 |
| 4,019,274 | A * | 4/1977 | Landell et al. | 43/55 |
| 4,030,227 | A * | 6/1977 | Oftedahl | 43/56 |
| 4,040,200 | A * | 8/1977 | Tomita | 43/57 |
| 4,096,657 | A * | 6/1978 | Morrow | 43/56 |
| 4,261,131 | A * | 4/1981 | Poffenberger | 43/57 |
| 4,513,525 | A * | 4/1985 | Ward et al. | 43/55 |
| 4,606,143 | A * | 8/1986 | Murphy, Jr. | 43/56 |
| 4,642,934 | A * | 2/1987 | Carlson et al. | 43/55 |
| 4,686,788 | A * | 8/1987 | Hartman | 43/56 |
| 4,697,380 | A * | 10/1987 | Fenske | 43/55 |
| 4,757,636 | A * | 7/1988 | Lambourn | 43/57 |
| 4,787,169 | A * | 11/1988 | Maxfield et al. | 43/57 |
| 4,829,698 | A * | 5/1989 | McDonald | 43/57 |
| 4,864,769 | A * | 9/1989 | Sandahl | 43/55 |
| 4,887,380 | A * | 12/1989 | Andrews | 43/56 |
| 5,109,625 | A * | 5/1992 | Skrede | 43/56 |
| 5,123,198 | A * | 6/1992 | Von Grossmann | 43/55 |
| 5,138,975 | A * | 8/1992 | Walsh | 43/56 |
| D333,862 | S * | 3/1993 | Merechka | D22/136 |
| 5,228,231 | A * | 7/1993 | Larson | 43/56 |
| 5,267,410 | A * | 12/1993 | Peyatt | 43/57 |
| 5,634,291 | A * | 6/1997 | Pham | 43/57 |
| 5,661,924 | A * | 9/1997 | Maxwell | 43/55 |
| 5,797,213 | A * | 8/1998 | Frick | 43/55 |
| 5,799,435 | A * | 9/1998 | Stafford | 43/57 |
| 5,802,760 | A * | 9/1998 | Campbell | 43/57 |
| 5,921,017 | A * | 7/1999 | Clark et al. | 43/57 |
| 6,729,066 | B1 * | 5/2004 | Howley | 43/56 |
| 6,820,364 | B1 * | 11/2004 | Tyson | 43/56 |
| 6,836,998 | B1 * | 1/2005 | Rucker | 43/57 |
| 6,857,222 | B1 * | 2/2005 | King | 43/56 |
| 6,886,291 | B1 * | 5/2005 | Jaggers | 43/56 |
| 7,140,600 | B1 * | 11/2006 | Wry | 43/57 |
| 7,162,831 | B1 * | 1/2007 | Morton et al. | 43/57 |
| 7,299,585 | B2 * | 11/2007 | Perttu | 43/56 |
| 7,377,071 | B1 * | 5/2008 | Thompson | 43/56 |
| 2002/0020104 | A1 * | 2/2002 | Kolar et al. | 43/55 |
| 2005/0086851 | A1 * | 4/2005 | Carden et al. | 43/56 |
| 2006/0016119 | A1 * | 1/2006 | Ashburn et al. | 43/56 |
| 2008/0028667 | A1 * | 2/2008 | Grzybowski | 43/57 |
| 2008/0190011 | A1 * | 8/2008 | Neal et al. | 43/56 |
| 2009/0025271 | A1 * | 1/2009 | Duckworth | 43/55 |
| 2009/0172994 | A1 * | 7/2009 | Sloop et al. | 43/57 |

FOREIGN PATENT DOCUMENTS

| | | | |
|---|---|---|---|
| JP | 07274788 | A * | 10/1995 |
| JP | 09037697 | A * | 2/1997 |
| JP | 10215746 | A * | 8/1998 |
| JP | 10323151 | A * | 12/1998 |
| JP | 2001148986 | A * | 6/2001 |
| JP | 2002186393 | A * | 7/2002 |

* cited by examiner

AERATED BUCKET FOR LIVE BAIT

FIELD OF THE INVENTION

This invention relates to a bait container or bucket in which water is aerated to keep bait, such as minnows and shrimp, alive and swimming normally until one of the bait is to be selected for use, typically to be hooked on a line of a fishing rod or pole being used by a person, whether a fisherman or fisherwoman.

BACKGROUND OF THE INVENTION

The purpose of a live bait "well", container or bucket is not only to maintain the bait in good, lively condition, but also to ensure that the bait can be readily, easily and speedily retrieved under exigent conditions encountered when fishing with a fishing rod in one's hands and fish suddenly exhibiting a feeding frenzy. To meet the demands of such conditions, it is critical that the structural components of the "live well", container or bucket and the manner in which they interact are so designed as to allow a fisherman to choose a bait from those swimming around in the well, container or bucket, under conditions which require that only one of his hands is used to pick out a bait, whether a small fish such as a minnow or a shrimp for use, while holding his fishing rod in the other. It is well known that, when fishing, it is inconvenient and impractical to lay down the rod while attending to retrieving bait from the bait bucket.

A live well for bait is typically substantially larger than a more commonly used container such as a bucket. Whether a live well, a bucket or other container, each may be used in a wide variety of sizes and each may have an arbitrary cross-section chosen for convenience in the particular environment in which the bait is to be used. Commonly used bait containers have cross-sections which are either polygonal or circular; the polygonal ones are typically either rectangular or square; and the ones with a circular cross-section may be either cylindrical or tapered. Most preferred and commonly used is a bait bucket having a cross-section which is either square, rectangular or circular, and one with a circular cross-section may be tapered from top to bottom, the area of the bottom being substantially smaller than the area at the top of the bucket. In the following description, the term "bucket" is used simply because a bucket is commonly used.

A commonly used bait bucket comprises a bucket in which a perforated or porous bowl-shaped container, referred to herein as a colander or perforated basket (hereafter "colander"), is removably, slidably inserted. By "bowl-shaped" is meant that the bowl is approximately concavo-convex. The bucket, in use, is filled with water to a desired level, sufficient to keep the bait alive and in good health for as long as the water is adequately aerated. The bucket is usually covered with a close-fitting substantially rigid lid which is provided with a central opening, at least large enough to allow a person's closed hand or fist to go through the opening to pick out a bait. The opening in the lid is provided with a hinged, perforated or porous flap which allows free flow of air into and out of the bucket while keeping the bait caged in the bucket. A combination of an aerator or "air-pump" powered by a battery is positioned at a convenient location outside the bucket, and an air-hose from the air pump is immersed in the water so as to bubble air under pressure through the water.

An additional feature in a preferred live bait bucket is a drain through which used or stale water can be drained out of the bucket either before it is replenished, or while it is being replenished with water, whether the water is salt water, brackish water or fresh water, and whether the bucket is to be drained on land, or in a boat on the water. Moreover, it is desirable that the drain be opened and closed, with one hand, conveniently, even when the bucket is being drained in a moving boat.

Given the basically simple requirements of an easy-to-use bait bucket, it is to be expected that the ultimate, well-designed, practical, reliable and convenient-to-use bucket would have been marketed and used for a long time. That there have been so many attempts to construct a bait bucket which addresses the problems inherent in the use of prior art bait buckets is evidence that providing the most practical and economical bait bucket for live bait is a difficult challenge.

As will be evident, the difficulty of catching one of only three or four remaining minnows or shrimp in a typical 5 gallon (18.9 liters) bucket, is substantially more difficult than catching one of several dozen swimming in the same bucket. The use of a colander which could be raised and lowered in an aerated bait bucket was disclosed more than a half century ago in U.S. Pat. No. 2,663,115. This construction addressed the requirement that the bait be separated from the water in which they were swimming to afford the fisherman a better chance of catching and using a single bait. However, it is readily apparent that retrieving a single minnow from the water in the minnow bucket disclosed in this '115 patent, necessitates the use of two hands; this requires that the fisherman either put down his rod, or have a second person help.

Comparably old disclosures in U.S. Pat. Nos. 3,039,225 and 3,319,372 use a flexible net as a scoop, which again requires the use of both hands. Still other live bait buckets use complicated gating devices to control the flow of water so as to allow the bait to be separated from the water in which they were swimming.

The problems to be solved:

1. It is critical that all operations on the bucket are able to be executed by a fisherman using only one hand.
2. A single minnow or shrimp is to be retrieved from all the bait in the bucket, and all the bait in the bucket is to be presented out of the water, that is, above or near the surface of the water in the bucket. Therefore, all the bait is to be concentrated in the colander, above or near the surface of the water, when a single bait is to be retrieved. In addition to allowing a single minnow or shrimp to be retrieved from the multiplicity of live minnows and shrimp, retrieving all bait from the water at one time, allows a dead minnow to be singled out and discarded as soon as it is discovered, so that it does not foul the water.
3. Where a colander is to be used, retrieval of the live bait from the water is to be accomplished without allowing any of the bait to escape from the colander, for example, by jumping through the annular space between its periphery and the inner wall of the bucket.
4. The colander, is to be raised with one hand, and once raised, with no continued manual force being exerted to maintain its position, its position above or near the surface of the water is maintained, and the colander is not lowered back into the water due to the weight of the bait in the colander.
5. As is often done in premium bait buckets, a drain is provided to permit water from the bucket to be drained, when desired. This is done with a pet-cock which typically protrudes more than 1 inch (2.54 cm) from the outer surface of the bucket; alternatively, instead of opening a valve, a cap is removed by unscrewing it from the surface of an exteriorly threaded nozzle which projects more than 1" (2.54 cm) from the outer surface of the bucket. Though either the valve can be opened with one hand, or the cap can be removed with one hand, the location of the exteriorly protruding drain requires that a person bend all the way down to the surface on which the bucket rests, to open the drain.

Further, it is easy to damage the exteriorly protruding drain or valve when the bucket is inadvertently banged against the inside of the boat; and it is also easy to lose the cap after it is removed. The seriousness of this problem has, to date, not been recognized. No disclosure in prior art bait buckets suggests how to solve this problem.

Commonly used, aerated live bait buckets which use a colander suffer from one or more disadvantages caused by one or more of the foregoing problems but the buckets are nevertheless in general use. The novel live bait bucket of this invention provides a solution to all the foregoing problems.

SUMMARY OF THE INVENTION

A live bait "well" or container (hereafter "bucket" for convenience) of arbitrary internal cross-section, closed with a substantially rigid lid, is provided with a bait-retrieval assembly constructed with commonly available structural elements so as to provide an unexpectedly functional and reliable bait bucket from which a bait of choice is readily accessed using one hand only. The retrieval assembly comprises a colander supported on an L-shaped frame with twin rectilinear members, laterally spaced-apart in the same plane, which in operation of the retrieval assembly, are near-vertical but critically non-parallel. The colander may be raised with the L-shaped frame and temporarily locked in position, above or near the surface of the water in the bucket, because the lateral distance between the vertical members adjacent the colander near the bottom of the L is less than the lateral distance between them near the top of the L where the vertical members are spaced-apart by a removable cross member. A hinged flap in the lid, is openable with one hand, before or after raising the L-shaped frame, to provide manual access to the bait, all of which is concentrated in the colander. If desired, the flap may be opened concurrently with raising the colander. A single live bait may be retrieved, and the colander returned to the bottom of the bucket by pushing down on the L-frame with one hand only, concurrently closing the flap on the lid of the bucket.

More particularly, a colander having a periphery adapted to be closely adjacent the periphery of the internal walls of the bait container, to preclude a bait from escaping through the peripheral space between the periphery of the colander and the walls of the container, is supported and immovably secured to the lower portion of the L-frame, the members of which are preferably of the same stock, whether rods, struts or tubes. By "a colander having a periphery closely adjacent the periphery of the internal walls of the bait container" is meant that the width of the space between the periphery of the colander and the internal surfaces of the walls of the container is so small that bait cannot escape through the space. When the internal cross-section near the top of the container is greater than the cross-section near the bottom, the diameter of the colander is chosen so as to effectively seal the varying width of the annular or peripheral space, from bottom to top of the container, with a peripheral skirt. Accordingly, the periphery of the colander is provided with a flexible skirt projecting outwardly, and having a radial width sufficient to be closely adjacent, and preferably engage, the inner walls of the container from near its bottom to near its top.

The L-frame is slidably vertically reciprocable through a pair of laterally spaced apart through-apertures in the lid fitted on the bucket. Raising the L-shaped frame, using one hand only on an upper cross-member of the L-shaped frame, raises the colander from a lowered to an elevated position above or near the surface of the water in the bucket. Preferably, a flexible connection such as a cord, connecting the top of the L-shaped handle to a foraminous flap in the lid, raises the flap when the L-shaped handle is raised; the colander, with bait in it, is maintained in the elevated position because the vertical members of the L-shaped frame which are secured in the lid by the bias and friction generated by the "taper" or "wedge-shaped" orientation of the vertical members; when the upper cross-member is pushed downwards, again using one hand only, the colander with live unused bait, is lowered into the water and the flap is automatically closed.

A drain valve is preferably positioned within the bucket, on or near its bottom, and the valve is openable and closable from above the lid of the bucket, using a removable stub handle on a vertical valve stem extending through and above the lid of the bucket. Removing the stub handle permits the lid of the bucket and the retrieval assembly to be withdrawn from the bucket.

In one preferred embodiment of the container is a tapered insulated bucket in which the retrieval assembly is raised and lowered by using the upper cross-tube of the L-shaped frame; the cross-tube connects the upper ends of the frame's pair of spaced-apart rectilinear vertical members; having upper ends and lower ends, and a lower cross-tube connects the ends of a pair of spaced-apart horizontal rectilinear members attached to the lower ends of the vertical members, so that the horizontal members are substantially orthogonal relative to the vertical members; to retrieve a bait, only one hand is used to raise the L-shaped frame and the colander; if the flap on the lid is not connected with a string or cord to the cross-member of the L-shaped frame, the same hand (since the other hand may be holding a fishing rod) lifts the flap to expose the opening in the lid; the same hand retrieves a bait and then pushes down on the upper cross-tube to lower the colander into the water; the colander is supported on the horizontal members of the frame; the vertical members are in mirror image relationship with one another, and spaced so that the distance between the longitudinal center lines of the lower ends is less than the distance between longitudinal center lines of the upper ends; the apertures in the lid are spaced-apart corresponding to the distance between the upper ends so that the upper portions of the vertical members are slidable downwards in the apertures; but the spacing of the apertures is less than the distance between the lower ends so that when the vertical members are raised, they are wedged near their lower ends in the apertures of the lid; the colander is provided with a peripheral skirt which preferably engages the inner surface of the tapered bucket. To keep the water cool, the bucket is insulated.

In another preferred embodiment the bucket is cylindrical, and the colander has a peripheral diameter such that the colander is slidable within the bucket from a position near its bottom to a position above or near the surface of the water in which the bait is kept alive. The L-shaped frame is substantially the same as the one used for a tapered bucket; and to keep the water cool, the bucket is insulated.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
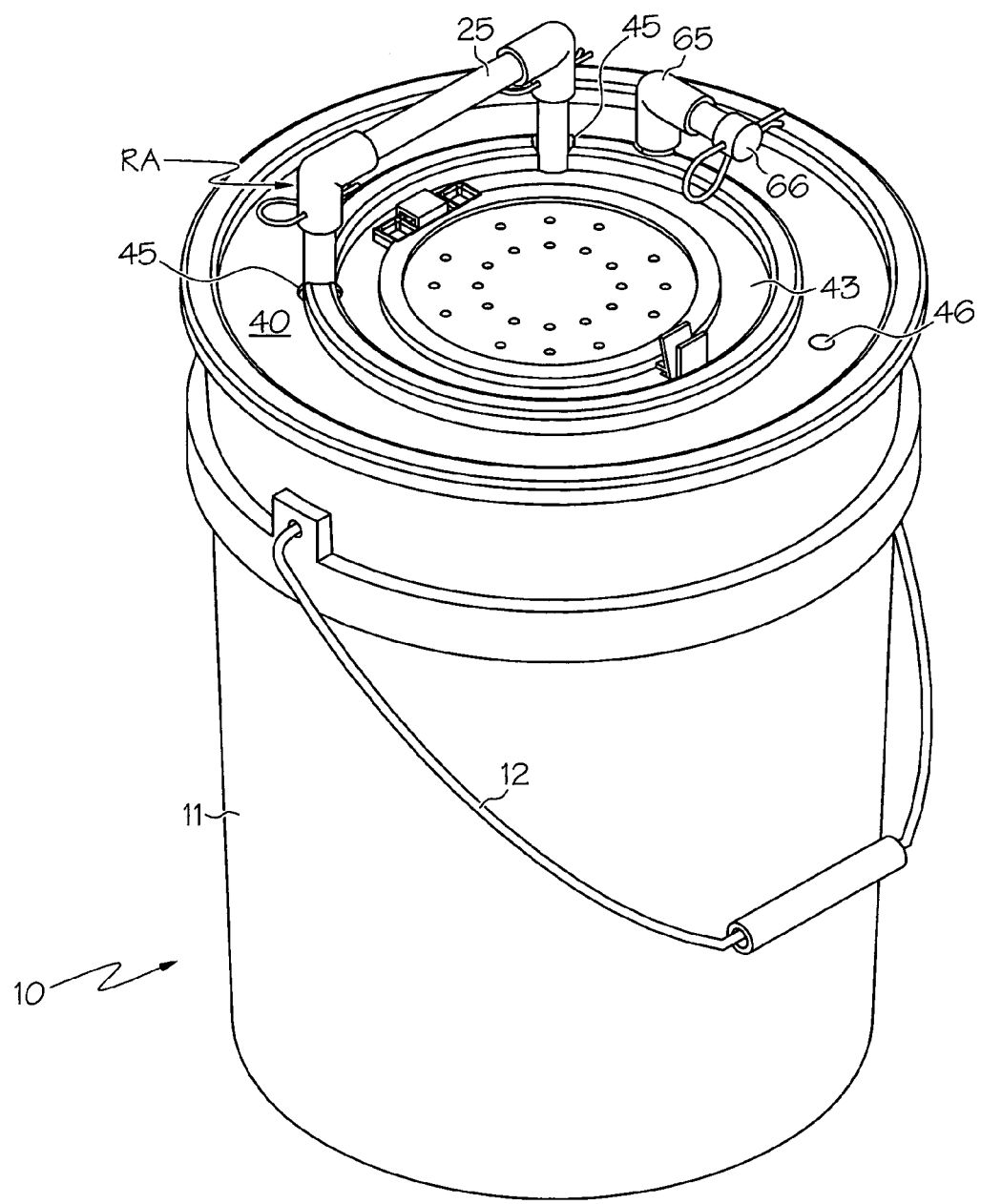
FIG. 1 is a perspective view of a tapered bait bucket in which the L-shaped frame of the retrieval assembly is in the "down" position and the opening (for access with one's hand) in the lid is closed by a flap.
Figure 2:
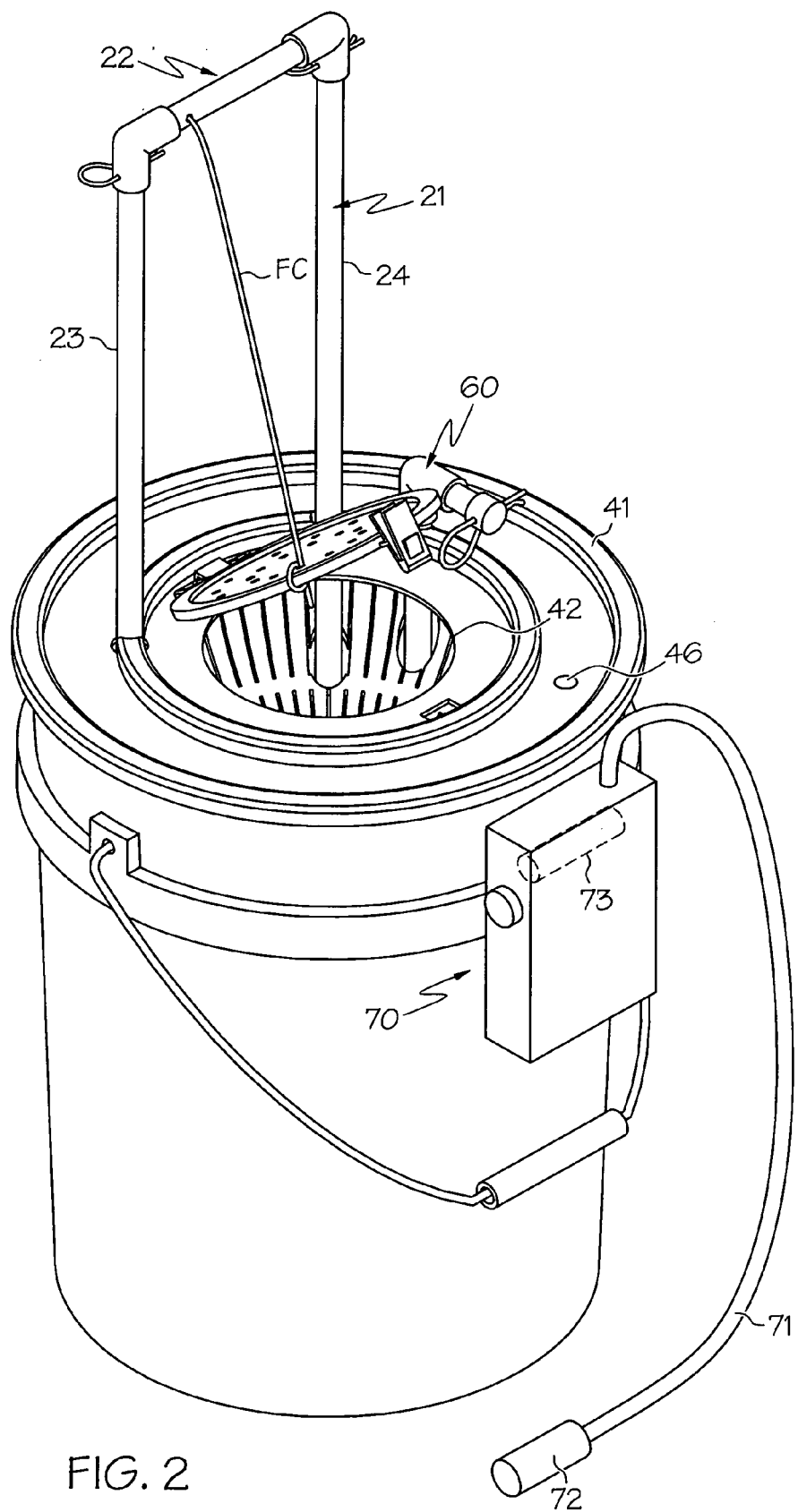
FIG. 2 is a perspective view of the bait bucket shown in FIG. 1, in which bucket the L-shaped frame is in the "up" position and the opening in the lid is open because the flap is raised. An "air-pump" is shown clipped or otherwise removably mounted on the bucket, preferably to a bracket molded into, and forming an integral portion of the periphery of the lid.

Referring to the various Figures in the drawing, and more particularly to FIGS. 1 and 2, it is seen that a commonly commercially available, "standard" tapered 5 gallon (18.9 liters) bucket is preferably used to provide the bait bucket designated generally by reference numeral 10 in which a bucket 11 contains a retrieval assembly "RA" slidably inserted into the bucket. The bucket is preferably provided with a handle 12 for easy portability and a substantially rigid lid 40 with a peripheral flange 41 adapted to snap over and removably lock onto the upper periphery of the bucket. Such tapered 5 gal buckets have an inner diameter near the base (at the bottom) of about 10.25 ins. (26.0 cm) and an inner diameter near the top of about 11.25 ins. (28.57 cm) and are readily available commercially. Smaller or larger buckets may be used, if desired. The bucket 11 and lid 40 may be of metal or a synthetic resinous material ("plastic"), but is preferably of high density polyethylene (HDPE) or some other readily available thermoformable synthetic resinous material which is not susceptible to corrosion and can be readily cleaned so as to provide an environment in which the bait will happily survive.

The lid 40 is preferably provided with a central access opening 42 having a diameter in the range from about 4 ins (10.16 cm)-7 ins (17.78 cm) to allow a person to thrust his/her hand into the otherwise closed bucket 11. The central access opening 42 is closed with the flap 43 pivotally connected to the lid 40 by a hinge 44 (see FIG. 3) which has a bias such that the weight of the open flap 43 is sufficient to urge the flap into the closed position. The lid 40 is also provided with an opening 47 for passage of vertical valve stem 61.

If the bait is to live and be used over an extended period of time, or even several hours, and is to remain healthy, the bait bucket is additionally provided with an "air-pump" or aerator 70 to aerate the water placed in the bucket 11. The air pump 70 comprises in combination (i) a battery 73 to power the air-pump; (ii) an air-tube 71 inserted through an access opening 46 in the lid 40 and (iii) an air-dispersing means or bubbler 72 immersed in water in the bucket, to which bubbler the air-tube is connected at one end, the other end being connected at with the output of the air pump. The bubbler 72 is used to create air bubbles that are bubbled through the water to provide better contact of the air with the water, thus increasing the efficiency of getting oxygen absorbed into the air.

Referring particularly to FIG. 2, the flap 43 is in the open position. Though it is not necessary to lock the flap, in the closed position, to the lid, it is desirable to do so. To this end, the periphery of the flap 43 is provided with a flexible V-shaped projection 48 having a detent (not visible) on the outer surface of the distal arm (relative to the periphery of the flap) of the V-shaped projection. A slot 49 is provided in the lid 40 at a location in registry with the V-shaped projection 48 when the flap 43 is in the closed position, and the flap may be locked into the closed position by pressing the V-shaped projection into the slot 49.

Retrieval assembly RA (shown in FIG. 3) includes an L-shaped frame 21, the upper portion 22 of which frame is shown in the "up" position, wedged between apertures in the lid 40, to raise colander 50. The upper portion 22 includes spaced-apart vertical tubular members ("tubes") 23 and 24, preferred for convenience and economy, which are slidably disposed in correspondingly spaced-apart openings 45 in the lid 40, and the tubes are preferably connected at their upper ends by cross-tubular member ("cross-tube") 25 to provide a convenient gripping handle to raise and lower the L-shaped frame. The rigidity (referred to herein) of the lid is such that the through-apertures or openings 45 in the lid are not distensible by up-and-down movement of vertical members 23 and 24 of the L-shaped frame 21 in the lid. Though each of the tubes may be replaced with a solid rod, whether of metal or plastic, all tubes shown herein are of either polyethylene (PE), or chlorinated polyvinylchloride (CPVC) or polyvinylchloride (PVC). The cross-tube 25 is connected to tubes 23 and 24 with right angle ells 26 and 27 in which the ends of the cross-tube are adhesively secured. The ells 26 and 27 are removably secured to the upper ends of the vertical tubes 23 and 24 respectively, with spring clips 28 so that, when the cross-tube and ells are removed, the upper ends of the vertical tubes will, when pulled downwards through the lid, pass through the spaced-apart apertures in the lid 40, to permit disassembly of the retrieval assembly.

Figure 3:
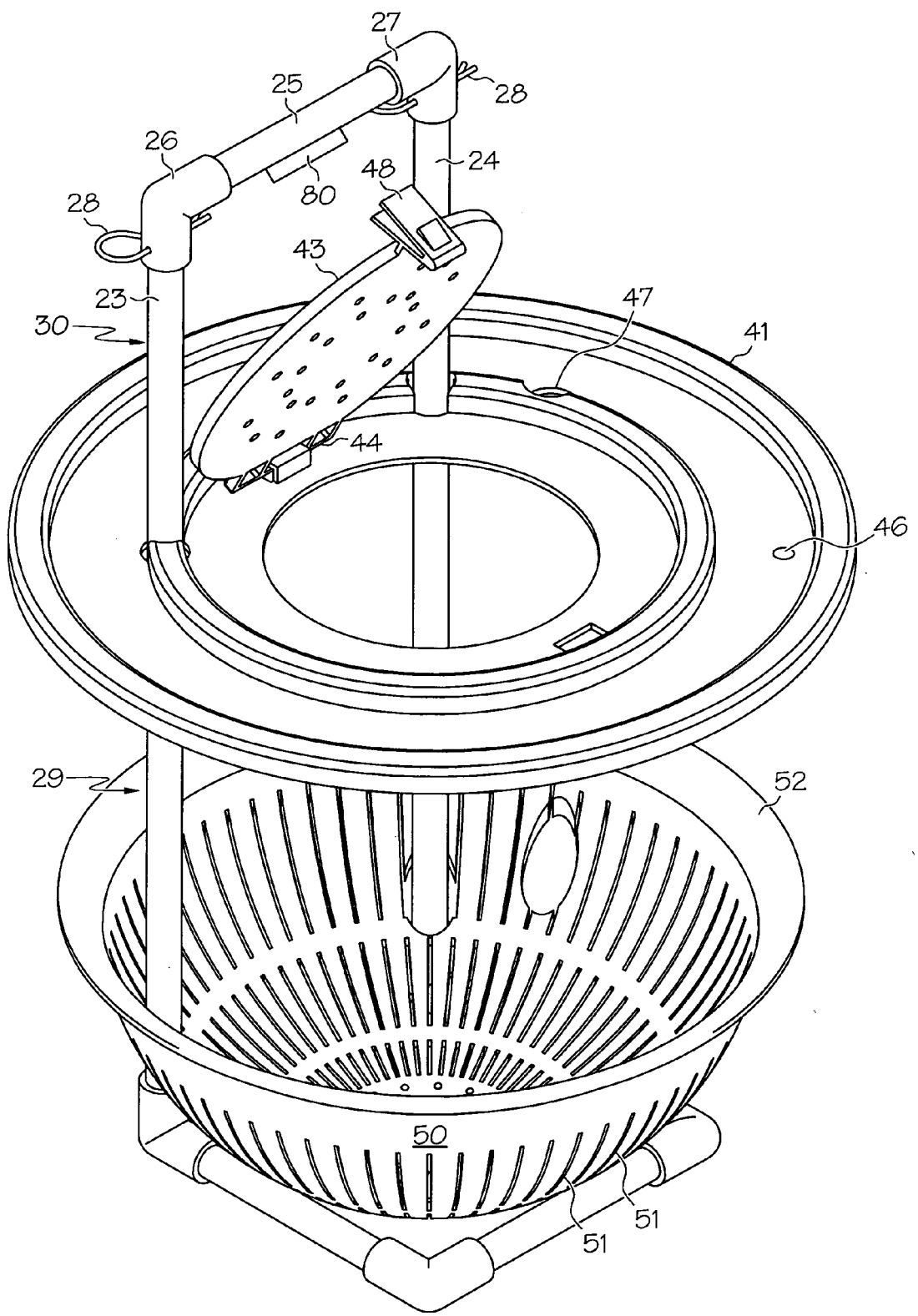
FIG. 3 is a perspective view of the bait-retrieval assembly of FIG. 2 showing the positioning of the tapered, wedge-shaped vertical members relative to the open flap, the diameter of which flap is preferably slightly greater than the spacing between the vertical members when a colander is in the "up" position.

Referring further to FIG. 3 there is shown the retrieval assembly RA with the flap 43 in the open position, preferably openable concurrently with raising of the L-shaped frame because the flap 43 is connected with a flexible connection "FC" to the L-shaped frame. The lid 40 is shown as being temporarily locked in position on the vertical tubes 23 and 24, near the lower portion 29 of the L-shaped frame 21. The spacing between the vertical tubes 23 and 24 near the upper portion 30 of the frame is such as to afford slidable movement of the upper portions of the tubes in the their respective spaced-apart openings 45 in the lid 40. However, the spacing between the vertical tubes 23 and 24 near the bottom of the frame is less than that in the upper portion, and so chosen as to frictionally bind the vertical tubes in their openings 45 since the openings 45 are spaced apart from each other at a distance which is greater than the spacing between the vertical tubes 23 and 24 near the lower portion 29 of the L-shaped frame 21.

For example, in an L-shaped frame adapted for use in a "standard" 5 gal bucket, the members are cut from 0.5" CPVC pipe which has a nominal outside diameter of about 0.625" (15.875 mm). The vertical members are spaced apart such that the distance between their longitudinal center lines at the top is about 5.375" (13.65 cm); and the distance between their longitudinal center lines at the bottom is about 5.25" (13.335 cm) so that the vertical tubes are positioned in mirror-image relationship with each other.

Figure 5:
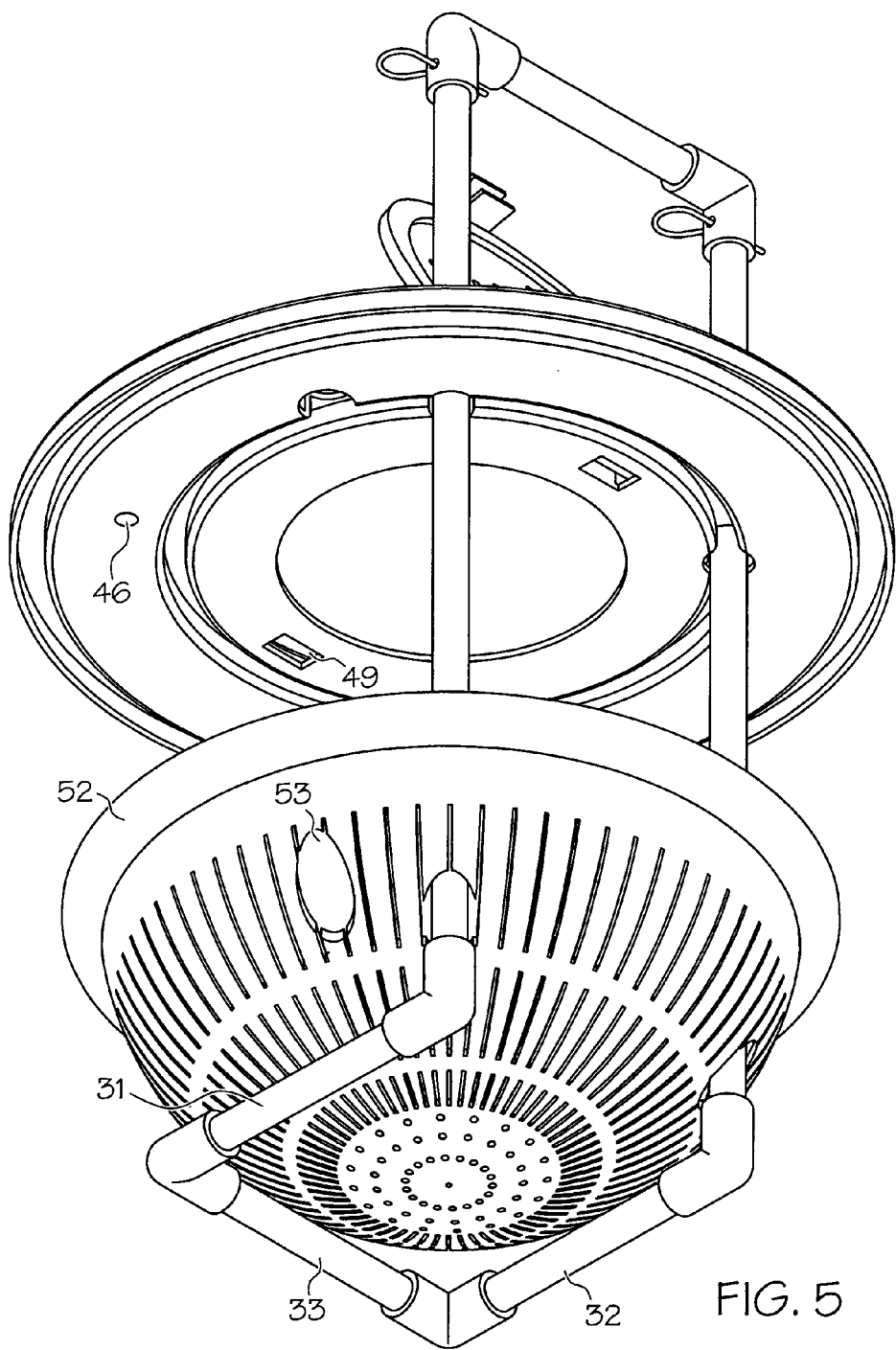
FIG. 5 is a bottom perspective view of the bait-retrieval assembly of FIG. 2 showing the positioning of the colander supported between spaced-apart horizontal rods or tubular members of the L-shaped frame; the slot in the colander is for passage of a vertical valve stem to open or close a drain valve in the bottom of the bucket.

The vertical tubes 23, 24 are spaced-apart in one half of the area of the lid, and the tubes are symmetrically disposed relative to the central access opening 43. The lower ends of the vertical tubes 23 and 24 are connected to spaced-apart horizontal tubes 31 and 32 (see FIG. 5) between which is positioned a colander 50 having a bowl with a diameter, measured across the periphery of its opening, which diameter closely matches, but is slightly less, from about 10 mils (254 micrometers) to 50 mils (1270 micrometers) than the inside diameter of the bottom of the bucket, so as to be snugly slidable into the bottom of the bucket 11. The colander 50 may be made of a non-corroding metal such as aluminum or copper, but for economy, is preferably of a synthetic resinous material, typically polyethylene, and relatively thin, preferably in the range from about 10 mils (254 μm) to 50 mils (1270 μm) thick, to save on weight and material, yet adequately support the weight of the bait to be kept in the bucket.

The colander 50 is preferably bowl-shaped, having a depth in the range from about 2" (5.08 cm)-6" (15.24 cm) is provided with perforations 51 small enough, that is, less than 0.25" wide, so as to preclude a bait from passing through one of the perforations. In addition, the colander is provided with three relatively larger openings. Two of the three openings (not numerically identified) are slightly, that is, in the range from 5 mils-10 mils wider, than the diameter of each vertical tube 23 and 24, and the openings are spaced-apart so as to correspond to the distance between the lower portions of the vertical tubes 23 and 24. The vertical tubes are inserted through the two openings and the colander is fixedly secured to these tubes, preferably adhesively, so as to locate the colander and have it rest between and be supported by horizontal tubes 31 and 32, centrally in the bucket.

For additional support and to strengthen the L-shaped frame 21, the horizontal tubes 31 and 32 are interconnected by a cross-tube 33, each end of which is securely fixed in right angle ells 34 and 35 respectively, which are also securely fixed to the ends of the horizontal tubes 31, 32.

As a result of the lateral spacing between the lower portions of the vertical tubes 23 and 24 being less than the spacing between their upper portions, an upward thrust of the assembly caused by pulling up on the upper portion of the L-shaped frame, causes the lower portions of the tubes 23 and 24 to become wedged in the lid 40 until the bait is chosen and the L-shaped frame is forced down through the lid 40.

As mentioned hereinabove, a commercially available "standard" bucket 11 is tapered so that there is a difference of about 1 inch (2.54 cm) between the diameters near the top and the bottom of the bucket. It will now be evident that, when the colander is raised into the upper portion of the bucket to be able to choose a bait, the annular space between the periphery of the colander and the inner surface of the upper portion of the bucket will be about 0.5" (1.27 cm), and large enough to permit a bait to jump out of the colander and into the water below the colander. To avoid losing a bait from the colander in such a manner, the periphery of the colander is provided with a continuous flexible skirt 52 fixedly secured to the periphery of the colander so that the skirt is outwardly, generally radially directed, and having a width sufficient to seal the annular space because the skirt is biased against the inner walls of the bucket. When the L-shaped frame is raised and lowered, the outwardly, generally radially projecting skirt 52 engages the cylindrical inner surface of the bucket so that the periphery of the skirt is biased against the inner surface sufficiently to seal the annular escape path of the bait. Alternatively, the periphery of the skirt is so closely adjacent the inner surface of the inner wall of the container as to seal the annular escape path of the bait. By "closely adjacent" is meant that the width of the annular or peripheral escape path depends upon the size of the bait being used, this width being not greater than the width of the body of the shrimp or minnow being used. Typically this width is less than 6.35 mm (0.25 in), but may be larger if larger bait having a body width of 12.7 mm (0.5 in) is to be used. When this width is reduced to zero, the periphery of the skirt engages the surface of the inner walls of the container irrespective of its cross-section.

Figure 4:
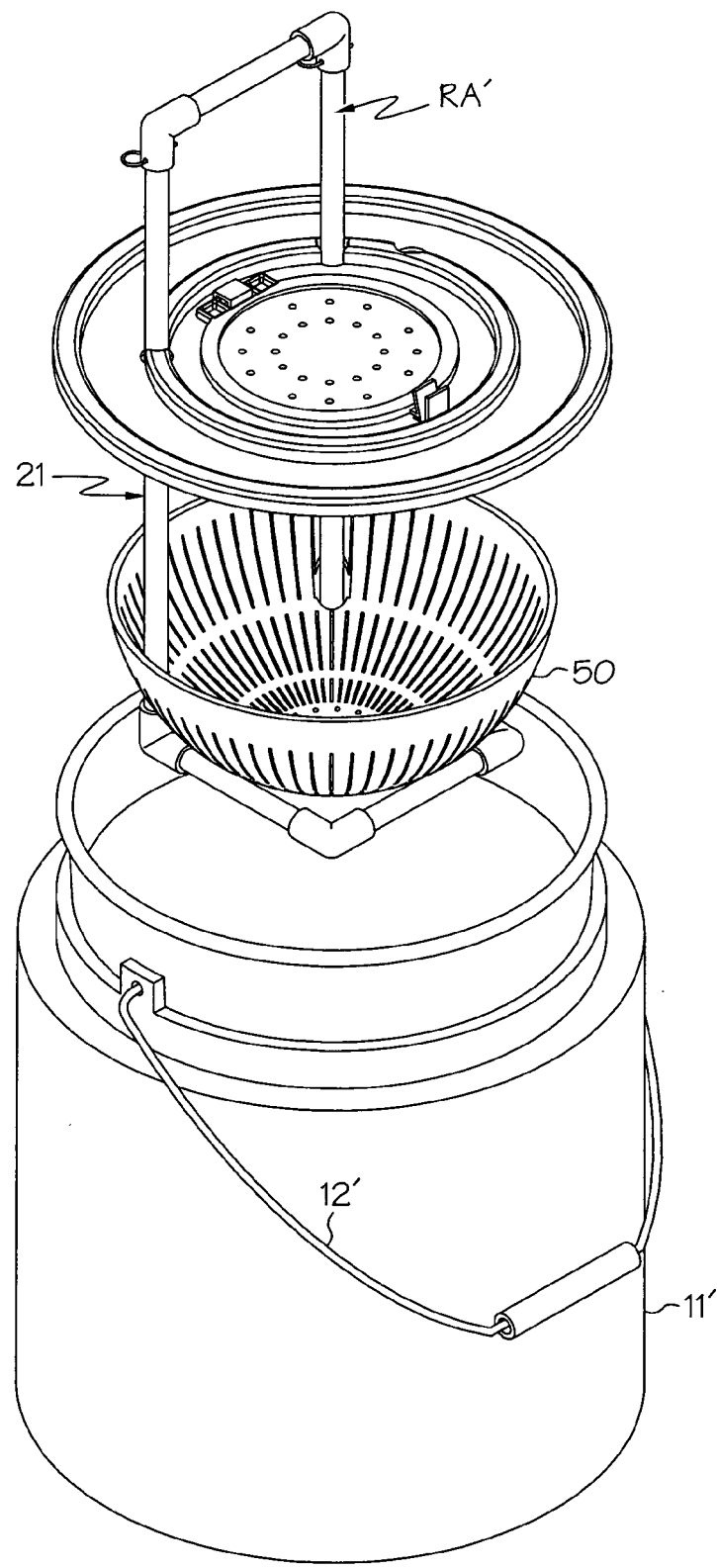
FIG. 4 is a perspective view of a bait-retrieval assembly for a cylindrical bucket, showing a colander having a periphery without a skirt, allowing the periphery of the colander to be slidably disposed within the cylindrical walls of the bucket so as to seal off the annular space between the periphery of the colander and the walls of the bucket, and prevent bait from escaping out of the colander into the water beneath.

Referring to FIG. 4 there is shown a retrieval assembly RA' for a common, "standard" cylindrical 5 gal bucket (not shown) 11' which is also commercially available. The retrieval assembly RA' is similar to the retrieval assembly RA described hereinabove except that the colander 50 is not provided with a skirt because the bucket is cylindrical and the diameter of the periphery of the colander which closely matches, but is slightly less than that of the inner diameter of the bucket near the bottom, also closely matches the inner diameter at the top, precluding the escape of bait. The bucket 11' is provided with insulation means 13, shown in FIG. 4, such as a synthetic resinous foam, preferably polystyrene foam, which covers the exterior circumferential surface of the bucket to keep the water in the bucket cool. Such insulation may also be provided for the tapered bucket 11. Alternatively, the bucket may be molded as an insulated bucket with a continuous internal skin of polymer, a continuous outer skin of polymer and foamed polymer sandwiched in between the inner and outer layers, as is well known in the art.

Figure 6:
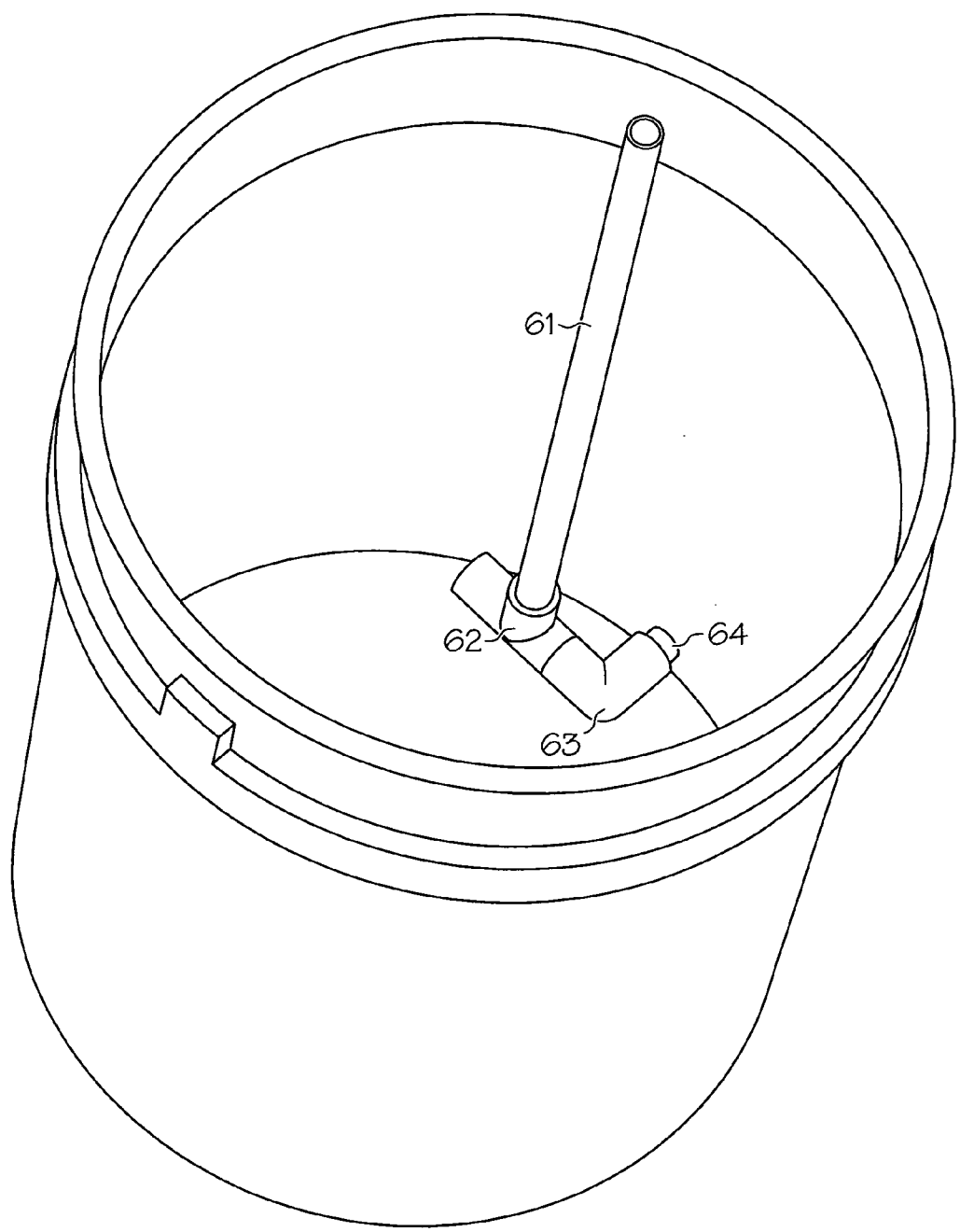
FIG. 6 is a top perspective view of the bucket in which the bait-retrieval assembly has been removed to show the drain valve in the bottom of the bucket and the vertical valve stem to operate the valve.

In both RA and RA', the colander 50 is provided with a vertical slot 53 having a width (measured laterally) sufficient to slidably closely accommodate vertical valve stem 61 of a drain assembly 60 which is essentially completely contained within the bucket 11 (see FIG. 6). Though a drain assembly is not essential, it is highly desirable, periodically, to drain "stale" water and replace it with "fresh" water, if the bait bucket 10 is to be used for more than several hours.

The drain assembly 60 includes an on/off rotary or ball valve 62 one end of which is in open fluid communication with water in the bucket; the other end of the ball valve is connected to one arm of a right angle ell 63. The other arm of the ell 63 is connected to one end of a stub end 64. The other end of the stub end 64, which is threaded on its surface, protrudes through an aperture in the sidewall of the bucket for a distance of about 0.5" (1.27 cm), just sufficient to permit the threaded end to be locked against the outer surface of the bucket with a locking ring (not shown). Vertical valve stem 61, when rotated, opens and shuts the valve 62. The upper end of the vertical valve stem 61 is securely fixed in a right angle ell 65 preferably extended with a stub end 66 to provide a handle for easily turning the valve from a closed to an open position, and vice versa, with one hand, leaning over only sufficiently to reach the top of the bucket.

For use at night, a light 80 is preferably removably mounted on the cross-tube 25 of the L-shaped frame 21 so as to shine onto the flap 43. When the flap is opened, the light shines directly onto the bait concentrated in the colander.

The tapered bucket 11 is readied for use by filling it with water to a level in the upper portion of the bucket so as to have an acceptably large volume of water in which to hold live bait to be introduced into the bucket. The right angle ell 63 and the stub end 64 are removed from the lower end of the vertical valve stem 61. The cross-tube 25 and right angle ells 26 and 27 are removed form the retrieval assembly RA and the vertical valve stem 61 is passed through the vertical slot 53 in the colander 50. The vertical tubes 23 and 24, are inserted through spaced-apart access openings for the tubes in the lid 40, and the vertical valve stem 61 is inserted through passage 47 in the lid. With the colander 50 in the bottom of the bucket, the lid 40 is snapped shut over the periphery of the bucket 11 and the right angle ell 63 with stub end 64 is replaced and locked in place on the bottom of vertical valve stem 61; and the cross-tube 25 and right angle ells 26, 27 are replaced and locked into place on the protruding upper ends of vertical tubes 23 and 24. The live bait is now introduced through the central access opening 42 and the battery switched on to start the aerator and bubble air through the water.

To retrieve a bait while still holding his fishing rod in one hand, the cross-tube 25 is raised with his free hand until the taper causes the vertical tubes to bind in their openings in the lid 40 bringing the colander 50 to a height above or near the surface of the water, with the bait concentrated in the colander and out of the water. The cross-tube 25 is released and the flap 43 is raised with the free hand, diametrically opposite ends of the flap coming to rest against the vertical tubes 23 and 24. If provided with a flexible connection, such as a piece of cord or string, between the flap 43 and the upper portion of the L-shaped frame 21, preferably by attaching one end of the cord to the cross-tube 25, the flap 43 is concurrently raised when the cross-tube is raised. With the same free hand he chooses a bait, and with the bait still in his hand, pushes down on the cross-tube 25 to thrust the colander 50 back to the bottom of the bucket. The flap closes automatically when the L-shaped frame is lowered.

Having thus provided a general discussion, described the overall live bait bucket in detail and illustrated it with specific illustrations of the best mode of making and using it, it will be evident that the invention has provided an effective solution to an age-old problem. It is therefore to be understood that no undue restrictions are to be imposed by reason of the specific embodiments illustrated and discussed, and particularly that the invention is not restricted to a slavish adherence to the details set forth herein.

What is claimed is:

1. A container for live bait of chosen size, the container including a bait retrieval assembly and comprising:
    a substantially rigid lid removably disposed on an upper periphery of the container, the container having an internal area with a cross-section;
    the lid having an access opening having a diameter adapted for the passage of a single human hand, and a flap hingedly connected to the lid so as to allow access of the hand into the container;
    the bait retrieval assembly comprising an L-shaped frame including a pair of spaced-apart rectilinear vertical members having upper ends and lower ends, and a pair of spaced-apart horizontal rectilinear members attached to the lower ends of the vertical members in substantially orthogonal relationship therewith;
    a bowl-shaped colander or perforated basket supported on the horizontal rectilinear members;
    the L-shaped frame being vertically reciprocable relative to the lid by up-and-down movement of the vertical members through apertures in the lid;
    the vertical members being in mirror image relationship with one another, and spaced so that a distance between longitudinal center lines of the vertical members at the lower ends is less than a distance between longitudinal center lines of the vertical members at the upper ends;
    the apertures in the lid being spaced-apart at a distance therebetween corresponding to the distance between the longitudinal center lines of the vertical member at the upper ends which are slidable therein, but being spaced apart at the distance therebetween which is greater than the distance between the longitudinal center lines at the lower ends;
    the colander or perforated basket being insertable in the container, the colander or perforated basket having a periphery adapted to be sufficiently closely adjacent an internal periphery of the container to prevent the escape of the bait;
    whereby the L-shaped frame may be raised, and a bait of choice in the colander or perforated basket retrieved using only one hand.

2. The container of claim 1 wherein the vertical members are connected to each other at the upper ends thereof with a removable rectilinear cross-member so as to allow, when removed, the upper ends of the vertical members to be withdrawn downwards through the lid.

3. The container of claim 2 including an aerator including a battery means for operation thereof.

4. The container of claim 3 including a drain assembly contained within the container and projecting through a sidewall of the container for a distance less than 2.54 cm, the drain assembly including an on/off valve having a vertical valve stem protruding through the lid and adapted to open and close the valve from above the lid.

5. The container of claim 4 including a flexible connection means connecting the flap to the removable rectilinear cross-member, insulation covering an exterior circumferential surface of the container, and wherein the aerator includes an air-dispersing means adapted to be submerged in water.

6. The container of claim 3 wherein the container is a cylindrical bucket having a cross-sectional area which is the same near a bottom of the bucket and near a top of the bucket; and,
    the colander or perforated basket has a periphery which is closely adjacent the internal periphery of the container which is defined by a sidewall of the bucket.

7. The container of claim 6 including a flexible means connecting the flap to the removable rectilinear cross-member, wherein the periphery of the colander or perforated basket engages an inner surface of the inner walls of the bucket, the aerator includes an air-dispersing means adapted to be submerged in water.

8. The container of claim 7 including a drain assembly contained within the container and projecting through the sidewall of the bucket for a distance less than 2.54 cm, the drain assembly including an on/off valve having a vertical valve stem protruding through the lid and adapted to open and close the valve from above the lid.

9. The container of claim 8 including insulation covering an exterior circumferential surface of the bucket.

10. The container of claim 2 wherein the container is a tapered bucket having a cross-sectional area which is smaller near a bottom of the tapered bucket than at a top of the tapered bucket; and,
    the colander or perforated basket has a periphery provided with an outwardly projecting peripheral skirt having a radial width such that a periphery of the skirt is closely adjacent an inner surface of the tapered bucket so as to allow the colander or perforated basket to be slidably reciprocable in the tapered bucket from a position in the bottom of the tapered bucket to a position near the top of the tapered bucket.

11. The container of claim 10 including an aerator comprising an air dispersing means adapted to be submerged in water and a battery means for operation of the aerator.

12. The container of claim 11 including a drain assembly contained within the tapered bucket and projecting through a sidewall of the tapered bucket for a distance less than 2.54 cm, the drain assembly including an on/off valve having a vertical valve stem protruding through the lid and adapted to open and close the valve from above the lid.

13. The container of claim 12 including a flexible connection means connecting the flap to the removable rectilinear cross-member, insulation covering an exterior circumferential surface of the tapered bucket, wherein the aerator includes an air-dispersing means adapted to be submerged in water.

* * * * *